United States Patent [19]

Manzouji et al.

[11] Patent Number: 5,658,965
[45] Date of Patent: Aug. 19, 1997

[54] RADIATION CURABLE SILICONE RELEASE COATING COMPOSITION

[75] Inventors: Ryuko Manzouji; Tadashi Okawa, both of Chiba Prefecture, Japan

[73] Assignee: Dow Corning Toray Silicone Co., Ltd., Tokyo, Japan

[21] Appl. No.: 622,974

[22] Filed: Mar. 27, 1996

[30] Foreign Application Priority Data

Mar. 30, 1995 [JP] Japan .................................. 7-097824

[51] Int. Cl.$^6$ .................... C08C 2/50; C08C 283/12; C08C 220/32
[52] U.S. Cl. .................... 522/31; 522/32; 522/148; 522/170
[58] Field of Search .................... 522/99, 148, 170, 522/31, 32; 528/24, 21, 26, 32, 40; 526/279

[56] References Cited

U.S. PATENT DOCUMENTS

| | | | |
|---|---|---|---|
| 4,421,904 | 12/1983 | Eckberg et al. | 522/148 |
| 4,640,967 | 2/1987 | Eckberg | 522/99 |
| 5,049,617 | 9/1991 | Yoshioka et al. | 526/279 |
| 5,079,312 | 1/1992 | Isozaki et al. | 526/279 |
| 5,198,476 | 3/1993 | Kobayashi et al. | 522/149 |
| 5,264,499 | 11/1993 | Hayashi et al. | 525/478 |
| 5,328,941 | 7/1994 | Hayashi et al. | 522/33 |

FOREIGN PATENT DOCUMENTS 2-98511  12/1990  Japan.
323284  11/1992  Japan.

*Primary Examiner*—Susan W. Berman
*Attorney, Agent, or Firm*—Timothy J. Troy

[57] ABSTRACT

The present invention relates to a radiation curable silicone release coating composition comprising an alicyclic epoxy-functional silicone graft copolymer and a photocuring catalyst. The release coatings of this invention upon curing by exposure to UV light form release films that are highly adhesive for a variety of substrates, have an excellent coatability, and its release resistance can be adjusted over a wide range of values.

24 Claims, No Drawings

RADIATION CURABLE SILICONE RELEASE COATING COMPOSITION

BACKGROUND OF THE INVENTION

The present invention relates to a curable silicone release coating composition. More particularly, the present invention relates to a curable silicone release coating composition which upon exposure to ultraviolet radiation cures into a very coatable release film that is strongly adherent to a variety of substrates and whose release resistance values can be adjusted over a broad range.

Silicone release coatings and silicone-organic copolymer release coatings have been used to impart releasability to the surfaces of paper and various types of plastic films and to the back surfaces of pressure-sensitive tapes and sheets. For example, in Japanese Patent Application Laid-Open Nos. 5-171047 (171,047/1993) and 6-16944 (16,944/1994), addition reaction-curing compositions and UV-curing compositions have been proposed as silicone release coatings.

Furthermore, in Japanese Patent Application Laid-Open Nos. 64-29459 (29,459/1989), 2-298511 (298,511/1990), and 4-323284 (323,284/1992), silicone-organic copolymer release coating compositions have been proposed as addition reaction-curing compositions and UV-curing compositions.

These silicone release coatings do form highly releasing cured films that give release resistance values on the level of 10 to 15 g/5 cm. However, the low surface energy of these cured films causes poor coatability or writability with oil-based inks and they have poor adhesiveness on polyester films. In contrast to this, the films afforded by the cure of silicone-organic copolymer release coatings are highly coatable and writable with oil-based inks and adhere well to polyester films. Unfortunately, since they exhibit release resistance values of about 120 to 410 g/2.5 cm, they cannot provide release resistance values as low as those of the cured films from silicone release coatings.

SUMMARY OF THE INVENTION

In specific terms, then, the object of the present invention is to introduce a curable silicone release coating composition which upon exposure to UV light cures into a highly coatable release film that is strongly adhesive for a variety of substrates and whose release resistance values can be adjusted over a broad range.

DETAILED DESCRIPTION OF THE INVENTION

The present invention relates to a radiation curable silicone release coating composition comprising: (A) 100 weight parts of an alicyclic epoxy-functional silicone graft copolymer prepared by a method comprising: (I) reacting a mixture comprising: (a) a silicone macromonomer which is free of epoxy groups and contains a vinyl-polymerizable group at one molecular chain terminal (b) a silicone compound having at least 1 alicyclic epoxy group and at least 1 vinyl-polymerizable group, and (c) an organic vinyl-polymerizable monomer with the proviso that the proportions for (a):(b):(c) are 1 to 80 weight percent:5 to 90 weight percent:0 to 94 weight percent, and also with the proviso that the sum of a+b+c is 100 weight percent, and (B) 0.1 to 20 weight parts of a photocuring catalyst. The mixture of step (I) can further comprise (d) a radical polymerization initiator.

The epoxy-functional silicone graft copolymer (A) is prepared by the copolymerization of components (a) and (b), or by the copolymerization of (a), (b), and (c).

The silicone macromonomer (a) is an organopolysiloxane that bears a vinyl-polymerizable group at one molecular chain terminal, wherein said vinyl-polymerizable group is exemplified by acryloxy, methacryloxy, acrylamide, methacrylamide, vinylphenyl, or vinyl. This organopolysiloxane preferably has a number-average molecular weight of 500 to 50,000 and more preferably 1,000 to 20,000. Larger degrees of polymerization for the siloxane chain in this component yield lower release resistance values for the cured film yielded by the composition according to the present invention. Its silicon-bonded groups other than the vinyl-polymerizable group are exemplified by alkyl groups such as methyl, ethyl, and propyl and by aryl groups such as phenyl. When this component also contains organopolysiloxane that is vinyl-polymerizable at both terminals, problems will occur during copolymerization such as gelation and/or a substantial increase in the viscosity. The admixture in this component of organopolysiloxane that is nonfunctional at both terminals raises the risk of bleed-out from the ultimately obtained cured film. These considerations make it highly desirable for the vinyl-polymerizable silicone macromonomer in this component to be very pure. The subject vinyl-polymerizable silicone macromonomer can be prepared, for example, by the nonequilibration ring-opening polymerization of cyclic trisiloxane followed by addition of vinyl-polymerizable group-functional dimethylchlorosilane. A high-purity vinyl-polymerizable silicone macromonomer can be recovered from this nonequilibration ring-opening polymerization by running said polymerization in the presence of a nitrile or ester compound and a polar solvent such as tetrahydrofuran or dimethylformamide such as the method disclosed in Japanese Patent Application No. 6-113951 (113,951/1994).

The above-described silicone macromonomer (a) is exemplified by compounds selected from

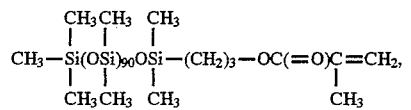

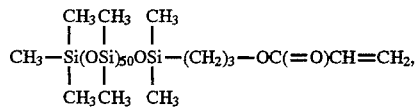

or

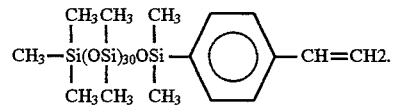

Component (b) is a compound that contains at least 1 alicyclic epoxy group and at least 1 vinyl-polymerizable group, wherein said alicyclic epoxy group is exemplified by 3,4-epoxycyclohexyl or 4-methyl-3,4-epoxycyclohexyl and said vinyl-polymerizable group is exemplified by acryloxy, methacryloxy, acrylamide, methacrylamide, vinylphenyl, or vinyl. This compound is exemplified by a silicone monomer having the formula

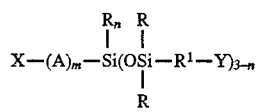

wherein X is a vinyl-polymerizable group, Y is an alicyclic epoxy group, each R is independently selected from monovalent hydrocarbon groups which are free of aliphatic unsaturation, $R^1$ is a divalent hydrocarbon group having at least 2 carbon atoms, A is selected from $R^1$ or a group —$R^2$—O—$R^2$— wherein each $R^2$ is independently selected from divalent hydrocarbon groups, m has an average value of 0 or 1, and n has an average value of 0, 1, or 2.

Preferably X is a group selected from acryloxy, methacryloxy, acrylamide, methacrylamide, vinylphenyl, or vinyl. Each R is preferably independently selected from alkyl groups such as methyl, ethyl, butyl, pentyl, or hexyl, aryl groups such as phenyl, tolyl, or xylyl, and aralkyl groups such as benzyl or phenethyl. The group $R^1$ is, for example, an alkylene group such as ethylene, propylene, butylene, or hexylene, or an arylene group such as phenylene. The group A is exemplified by ethylene, propylene, butylene, hexylene, or ethyleneoxypropylene. The silicone monomer can be synthesized, for example, by an addition reaction between a siloxane having the formula

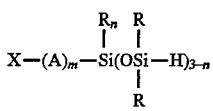

wherein R, A, X, m, and n are defined as above and an aliphatically unsaturated alicyclic epoxy compound.

Component (b) is exemplified by compounds selected from

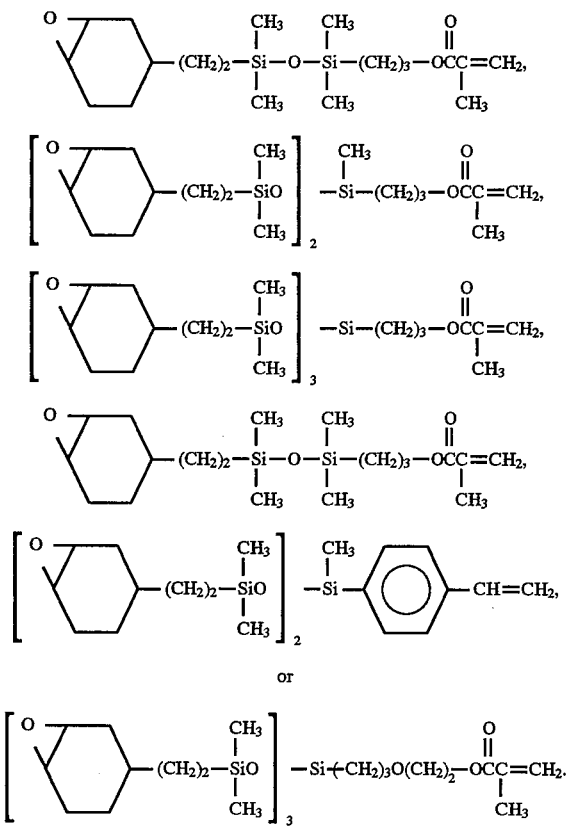

The vinyl-polymerizable monomer (c) is a monomer other than components (a) and (b) that is copolymerizable with components (a) and (b). Component (c) is exemplified by the various esters of acrylic acid and methacrylic acid, styrene and its derivatives, acrylic acid, methacrylic acid, vinyl acetate, vinylidene chloride, or polyalkylene glycol monomethacrylates. These may be used individually or as combinations of two or more selections. In order to improve the releasability exhibited by the ultimately obtained cured film, compounds that reduce the glass-transition point of the silicone graft copolymer (A), such as the acrylate esters, are preferred among the preceding examples. Particularly preferred for this purpose are the higher esters of acrylic acid, such as methyl acrylate, ethyl acrylate, or butyl acrylate.

The proportions for the reaction of components (a), (b), and (c) are (a):(b):(c) is 1 to 80 weight %:5 to 90 weight %:0 to 94 weight %, and the proportions are preferably 3 to 70 weight %:10 to 80 weight %:0 to 87 weight %. With regard to the component (a) proportion, the ultimately obtained cured film suffers from a reduced releasability at a component (a) proportion below 1 weight % and suffers from a reduced mechanical strength at above 80 weight %. With regard to the component (b) proportion, a component (b) proportion below 5 weight % results in a diminished curability for the composition according to the present invention, while a proportion in excess of 90 weight % causes a reduced releasability by the ultimately obtained cured film. The release resistance values of the ultimately obtained cured film decline as the component (a) content increases. The well-known copolymerization methods can be used here, such as radical polymerization, anionic polymerization, group-transfer polymerization, and so forth. Radical polymerization is preferred for its ease of execution. Suitable radical polymerization initiators are exemplified by azo compounds such as azobisisobutyronitrile and by peroxides such as benzoyl peroxide and dicumyl peroxide. The polymerization technique is exemplified by solution, emulsion, suspension, or bulk polymerization techniques. The preferred technique is solution polymerization, in which components (a) and (b) or (a) to (c) can be dissolved to homogeneity and polymerized in a homogeneous system. The solvent used for this purpose will vary depending on the nature and copolymerization proportion of component (c), but can be generally exemplified by aromatic hydrocarbons such as benzene, toluene, or xylene, ketones such as methyl ethyl ketone or methyl isobutyl ketone, esters such as ethyl acetate or butyl acetate, and ethers such as tetrahydrofuran, dioxane, or diethyl ether. These solvents can be used in combinations of 2 or more types.

The photocuring catalyst, component (B) functions to induce curing of the composition according to the present invention. Preferably the photocatalyst is an onium salt photocatalyst. The onium salt photocatalyst is exemplified by diazonium salts having the formula $ArN_2^+Z^-$ in which Ar is an aryl group and Z is a nonbasic, non-nucleophilic anion such as $BF_4$, $PF_6$, $AsF_6$, $SbF_6$, $SbCl_6$, $HSO_4$, or $ClO_4$, sulfonium salts having the formula $R_3^3S^+Z^-$ in which $R^3$ is alkyl or aryl and Z is defined as above, or iodonium salts having the formula $R^3_2I^+Z^-$ in which $R^3$ and Z are defined as above. Preferred photocuring catalysts for use in the radiation curable compositions of this invention are iodonium salts such as bis(dodecylphenyl)iodonium hexafluoroarsenate or bis(dodecylphenyl)iodonium hexafluoroantimonate. This component is added at 0.1 to 20 weight parts per 100 weight parts component (A) and preferably at 1 to 10 weight parts per 100 weight parts component (A). The composition according to the present invention suffers from a reduced curability at additions below 0.1 weight part, while additions in excess of 20 weight parts can lead to a reduced releasability of the ultimately obtained cured film.

The composition according to the present invention comprises the components (A) and (B) described hereinbefore, but may also contain organic solvent insofar as the object of the present invention is not impaired. Said organic solvent is exemplified by aromatic hydrocarbons such as benzene, toluene, or xylene, aliphatic hydrocarbons such as hexane or heptane, ketones such as acetone or methyl ethyl ketone, esters such as ethyl acetate or butyl acetate, and halogenated hydrocarbons such as trichloroethane or chloroform.

The composition according to the present invention can be prepared by mixing the components (A) and (B) described hereinbefore to homogeneity. In those cases where the alicyclic epoxy-functional silicone graft copolymer (A) is a solid, component (A) is preferably dissolved in the necessary amount of organic solvent prior to mixing it with component (B).

Since silicone graft copolymer (A) contains the highly reactive alicyclic epoxy group, the curable silicone release coating composition according to the present invention as described above readily undergoes ring-opening and crosslinking upon exposure to ultraviolet light in the presence of component (B) to form a cured film that exhibits an excellent adherence, coatability, printability/writability, and releasability. Coatability for the purposes of the present invention refers to the capacity of the cured film, after having been coated with paint or written on with an ink pen, to retain the paint or ink on its coated surface without crawling. Light sources such as high-pressure mercury lamps and metal halide lamps are typically used for UV exposure. Suitable substrates are exemplified by paper and various types of plastic films. The treatment technique can be those techniques heretofore employed in treatment with silicone release coatings. For example, the substrate can be coated using a treatment device such as a bar coater to give a coating weight for the composition according to the present invention of 0.1 to 10 g/m$^2$. In those cases where the composition according to the present invention has been dissolved in organic solvent, UV exposure is preferably carried out after the solvent has been evaporatively eliminated from the coated surface. A particular advantage offered by the composition according to the present invention is that the release resistance of its cured films can be adjusted over a broad range, from low values such as 10 g/38 mm to high values such as 720 g/38 mm, by varying the component (a) copolymerization proportion and the degree of polymerization of the siloxane chain in component (a).

The present invention will be explained in greater detail below through working examples, in which parts means weight parts and the values reported for viscosity were measured at 25° C. The release resistance, residual adhesiveness, and coatability of the cured films were measured using the following methods.

The release resistance was determined in the following manner: a commercial pressure-sensitive adhesive tape (width=38 mm, brand name: 31B, product of Nitto Denko Kabushiki Kaisha) was pressed, using one back-and-forth excursion with a 2-kg tape roller, onto the polyethylene surface after application thereto of the radiation curable silicone release coating composition and then cured. This assembly was then held for 20 hours at 70° C. with a load of 20 g/cm$^2$ on the pressure-sensitive adhesive tape. After this holding period, the sample was cooled at room temperature for 2 hours. Using a Tensilon, the pressure-sensitive adhesive tape was then peeled at 180° at a rate of 300 mm/minute and the force required for separation was measured (g/38 mm).

The Residual adhesiveness was determined using the following method. The separated pressure-sensitive tape afforded by measurement of the release resistance was folded in two. An evaluation was then made as to whether the two halves could be satisfactorily adhered to each other. A score of "++" was assigned when this adhesion was unchanged from its original level; a score of "+" was assigned when this adhesion was somewhat lower than the original level; and a score of "x" was assigned when there was almost no adhesion.

The coatability was determined in the following manner: using a commercial oil-based ink pen, characters were written on the polyethylene surface after application thereto of the radiation curable silicone release coating composition and curing of the composition. A score of "++" was assigned when absolutely no crawling occurred and the characters could be clearly written; a score of "+" was assigned when crawling occurred but the characters could still be written; and a score of "x" was assigned when the characters could not be written due to almost complete crawling.

REFERENCE EXAMPLE 1

150 parts of toluene was placed in a 100-mL flask equipped with a stirrer, thermometer, condenser, and nitrogen inlet tube and the dissolved oxygen in the system was replaced with nitrogen. Into this were then introduced 24 parts of methyl acrylate, 46 parts of 1-(3',4'-epoxycyclohexyl)ethyl-3-methacryloxypropyltetramethyldisiloxane, 30 parts of a silicone macromonomer having the average formula

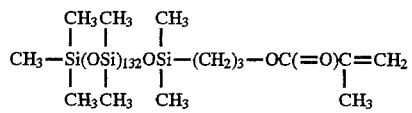

and 2 parts of azobisisobutyronitrile and the dissolved oxygen in the system was again replaced with nitrogen. The mixture was then stirred under nitrogen for 24 hours while heating to 60° C. to yield a toluene solution of an alicyclic epoxy-functional silicone graft copolymer. Analysis of this toluene solution by gel permeation chromatography (GPC) confirmed the almost complete disappearance of the starting material peaks. Elimination of the toluene and unreacted methyl acrylate from this toluene solution by heating at reduced pressure yielded a semi-solid alicyclic epoxy-functional silicone graft copolymer.

REFERENCE EXAMPLE 2

150 parts of toluene was placed in a 100-mL flask equipped with a stirrer, thermometer, condenser, and nitrogen inlet tube and the dissolved oxygen in the system was replaced with nitrogen. Into this were then introduced 30 parts of butyl acrylate, 40 parts of 1-(3',4'-epoxycyclohexyl) ethyl-3-methacryloxypropyltetramethyldisiloxane, 30 parts of a silicone macromonomer having the average formula

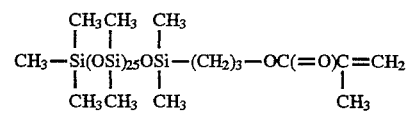

and 2 parts azobisisobutyronitrile and the dissolved oxygen in the system was again replaced with nitrogen. The mixture was then stirred under nitrogen for 24 hours while heating to 60° C. to yield a toluene solution of alicyclic epoxy-functional silicone graft copolymer. Analysis of this toluene solution by GPC confirmed the almost complete disappearance of the starting material peaks. Elimination of the toluene and unreacted butyl acrylate from this toluene solution by heating at reduced pressure yielded a semi-solid alicyclic epoxy-functional silicone graft copolymer.

REFERENCE EXAMPLE 3

150-parts of toluene was placed in a 100-mL flask equipped with a stirrer, thermometer, condenser, and nitrogen inlet tube and the dissolved oxygen in the system was replaced with nitrogen. Into this were then introduced 30 parts of butyl acrylate, 40 parts of 1-(3',4'-epoxycyclohexyl)ethyl-3-methacryloxypropyltetramethyldisiloxane, 30 parts of a silicone macromonomer having the average formula

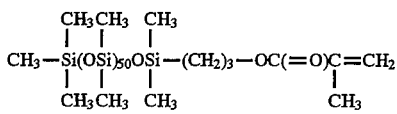

and 2 parts of azobisisobutyronitrile and the dissolved oxygen in the system was again replaced with nitrogen. The mixture was then stirred under nitrogen for 24 hours while heating to 60° C. to yield a toluene solution of alicyclic epoxy-functional silicone graft copolymer. Analysis of this toluene solution by GPC confirmed the almost complete disappearance of the starting material peaks. Elimination of the toluene and unreacted butyl acrylate from this toluene solution by heating at reduced pressure yielded a semi-solid alicyclic epoxy-functional silicone graft copolymer.

REFERENCE EXAMPLE 4

150 parts of toluene was placed in a 100-mL flask equipped with a stirrer, thermometer, condenser, and nitrogen inlet tube and the dissolved oxygen in the system was replaced with nitrogen. Into this were then introduced 30 parts of butyl acrylate, 40 parts of 1-(3',4'-epoxycyclohexyl)ethyl-3-methacryloxypropyltetramethyldisiloxane, 30 parts of a silicone macromonomer having the average formula

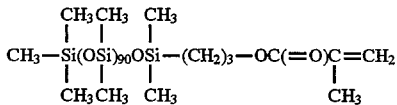

and 2 parts of azobisisobutyronitrile and the dissolved oxygen in the system was again replaced with nitrogen. The mixture was then stirred under nitrogen for 24 hours while heating to 60° C. to yield a toluene solution of alicyclic epoxy-functional silicone graft copolymer. Analysis of this toluene solution by GPC confirmed the almost complete disappearance of the starting material peaks. Elimination of the toluene and unreacted butyl acrylate from this toluene solution by heating at reduced pressure yielded a semi-solid alicyclic epoxy-functional silicone graft copolymer.

REFERENCE EXAMPLE 5

150 parts of toluene was placed in a 100-mL flask equipped with a stirrer, thermometer, condenser, and nitrogen inlet tube and the dissolved oxygen in the system was replaced with nitrogen. Into this were then introduced 40 parts of butyl acrylate, 50 parts of 1-(3',4'-epoxycyclohexyl)ethyl-3-methacryloxypropyltetramethyldisiloxane, 10 parts of a silicone macromonomer having the average formula

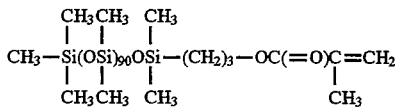

and 2 parts of azobisisobutyronitrile and the dissolved oxygen in the system was again replaced with nitrogen. The mixture was then stirred under nitrogen for 24 hours while heating to 60° C. to yield a toluene solution of alicyclic epoxy-functional silicone graft copolymer. Analysis of this toluene solution by GPC confirmed the almost complete disappearance of the starting material peaks. Elimination of the toluene and unreacted butyl acrylate from this toluene solution by heating at reduced pressure yielded a semi-solid alicyclic epoxy-functional silicone graft copolymer.

REFERENCE EXAMPLE 6

150 parts of toluene was placed in a 100-mL flask equipped with a stirrer, thermometer, condenser, and nitrogen inlet tube and the dissolved oxygen in the system was replaced with nitrogen. Into this were then introduced 35 parts of butyl acrylate, 45 parts of 1-(3',4'-epoxycyclohexyl)ethyl-3-methacryloxypropyltetramethyldisiloxane, 20 parts of a silicone macromonomer having the average formula

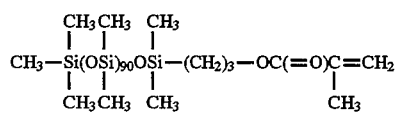

and 2 parts of azobisisobutyronitrile and the dissolved oxygen in the system was again replaced with nitrogen. The mixture was then stirred under nitrogen for 24 hours while heating to 60° C. to yield a toluene solution of alicyclic epoxy-functional silicone graft copolymer. Analysis of this toluene solution by GPC confirmed the almost complete disappearance of the starting material peaks. Elimination of the toluene and unreacted butyl acrylate from this toluene solution by heating at reduced pressure yielded a semi-solid alicyclic epoxy-functional silicone graft copolymer.

REFERENCE EXAMPLE 7

150 parts of toluene was placed in a 100-mL flask equipped with a stirrer, thermometer, condenser, and nitrogen inlet tube and the dissolved oxygen in the system was replaced with nitrogen. Into this were then introduced 35 parts of methyl methacrylate, 35 parts of 1-(3',4'-epoxycyclohexyl)ethyl-3-methacryloxypropyltetramethyldisiloxane, 30 parts of a silicone macromonomer having the average formula

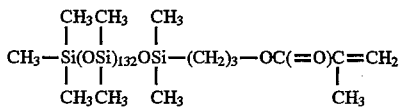

and 2 parts of azobisisobutyronitrile and the dissolved oxygen in the system was again replaced with nitrogen. The mixture was then stirred under nitrogen for 24 hours while heating to 60° C. to yield a toluene solution of alicyclic epoxy-functional silicone graft copolymer. Purification by reprecipitation was carried out by pouring this toluene solution into n-hexane and then adding methanol to yield a solid alicyclic epoxy-functional silicone graft copolymer.

EXAMPLES 1 TO 7

The respective radiation curable silicone release coating compositions were prepared by the addition, with mixing to homogeneity, of 2 parts an iodonium salt photocuring catalyst (GE9130C from the General Electric Company) to 100 parts of each of the alicyclic epoxy-functional silicone graft copolymers synthesized in Reference Examples 1 to 7. The resulting radiation curable silicone release coating compositions were dissolved in n-hexane to give a solids concentration of 7 weight %. Each solution was coated on the polyethylene surface of polyethylene-laminated paper using a bar coater to give a solids coating weight of 0.5 g/m$^2$. After the coating operation, the n-hexane was completely removed from the coated surface by holding in a 50° C. oven for 30 seconds. Curing was then effected by exposing (130 mJ/cm$^2$) the coated surface using an ultraviolet exposure device that contained a high-pressure mercury lamp. The release resistance, residual adhesiveness, and coatability of the resulting cured films were measured, and these results are reported in Table 1.

COMPARATIVE EXAMPLE 1

The following were dissolved in 68.7 parts of n-hexane: 30 parts of a trimethylsiloxy-endblocked methylvinylsiloxane-dimethylsiloxane copolymer gum having a vinyl content of about 0.9 weight %, 1 part of a trimethylsiloxy-endblocked methylhydrogensiloxane having a viscosity of 50 centipoise, and 0.3 parts of methylbutynol. A curable silicone release coating composition was prepared by the addition, to 100 parts of this solution, of 0.6 part chloroplatinic acid/divinyltetramethyldisiloxane complex (having a platinum metal content of about 0.51 weight %) and then adding 499.4 parts n-hexane to the solution. This curable silicone release coating composition was applied using a bar coater on the polyethylene surface of polyethylene-laminated paper to give a solids coating weight of 0.5 g/m$^2$. After the coating operation, the n-hexane was completely eliminated from the coated surface by holding in a 70° C. oven for 30 seconds. Curing was then effected by standing for 30 seconds in a 120° C. oven. The release resistance, residual adhesiveness, and coatability of the resulting cured film were measured, and-these results are reported in Table 1.

COMPARATIVE EXAMPLE 2

150 parts of toluene was placed in a 100-mL flask equipped with a stirrer, thermometer, condenser, and nitrogen inlet tube and the dissolved oxygen in the system was replaced with nitrogen. Into this were then introduced 47 parts of butyl acrylate, 23 parts of glycidyl methacrylate, 30 parts of a silicone macromonomer having the average formula

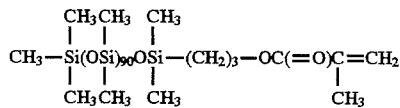

and 2 parts of azobisisobutyronitrile and the dissolved oxygen in the system was again replaced with nitrogen. The mixture was then stirred under nitrogen for 24 hours while heating to 60° C. to yield a toluene solution of an epoxy-functional silicone graft copolymer. Analysis of this toluene solution by GPC confirmed the almost complete disappearance of the starting material peaks. Elimination of the toluene and unreacted butyl acrylate from this toluene solution by heating at reduced pressure yielded an epoxy-functional silicone graft copolymer. The polyethylene surface of polyethylene-laminated paper was treated with this silicone graft copolymer using the procedure of Example 1 followed by exposure to UV light. When the treated surface was forcefully rubbed with a finger after UV exposure, blurring and cloudiness were produced, which confirmed that coating formation had not occurred.

TABLE 1

|  | release resistance | residual adhesiveness (g/38 mm) | coatability |
|---|---|---|---|
| Example 1 | 10 | + | + |
| Example 2 | 485 | ++ | + |
| Example 3 | 100 | ++ | + |
| Example 4 | 15 | + | + |
| Example 5 | 720 | ++ | + |
| Example 6 | 480 | ++ | + |
| Example 7 | 650 | + | + |
| Comparative Example 1 | 10 | ++ | x |

That which is claimed is:

1. A radiation curable silicone release coating composition comprising:

(A) 100 weight parts of an alicyclic epoxy-functional silicone graft copolymer prepared by a method comprising:

(I) reacting a mixture comprising:

(a) a silicone macromonomer which is free of epoxy groups and contains a vinyl-polymerizable group at one molecular chain terminal;

(b) a silicone compound having at least 1 alicyclic epoxy group and at least 1 vinyl-polymerizable group; and (c) an organic vinyl-polymerizable monomer with the proviso that the proportions for (a):(b):(c) are 1 to 80 weight percent:5 to 90 weight percent:0 to 94 weight percent, and also with the proviso that the sum of a+b+c is 100 weight percent; and (B) 0.1 to 20 weight parts of a photocuring catalyst.

2. A composition according to claim 1, wherein the mixture of (I) can further comprise (d) a radical polymerization initiator.

3. A composition according to claim 1, wherein the vinyl-polymerizable group of (a) is selected from acryloxy, methacryloxy, acrylamide, methacrylamide, vinylphenyl, or vinyl.

4. A composition according to claim 1, wherein (a) is a compound selected from

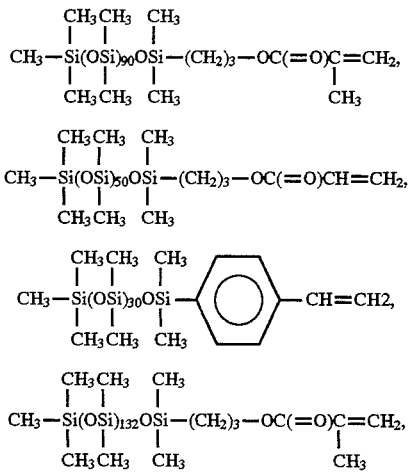

or

-continued

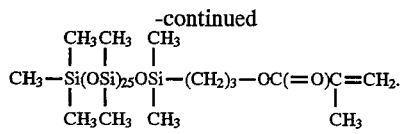

5. A composition according to claim 1, wherein the alicyclic epoxy group of (b) is selected from 3,4-epoxycyclohexyl or 4-methyl-3,4-epoxycyclohexyl.

6. A composition according to claim 1, wherein the vinyl-polymerizable group of (b) is selected from acryloxy, methacryloxy, acrylamide, methacrylamide, vinylphenyl, or vinyl.

7. A composition according to claim 1, wherein (b) is a compound having the formula

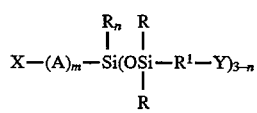

wherein X is a vinyl-polymerizable group, Y is an alicyclic epoxy group, each R is independently selected from monovalent hydrocarbon groups which are free of aliphatic unsaturation, $R^1$ is a divalent hydrocarbon group having at least 2 carbon atoms, A is selected from $R^1$ or a group —$R^2$—O—$R^2$— wherein each $R^2$ is independently selected from divalent hydrocarbon groups, m has an average value of 0 or 1, and n has an average value of 0, 1, or 2.

8. A composition according to claim 7, wherein X is selected from acryloxy, methacryloxy, acrylamide, methacrylamide, vinylphenyl, or vinyl.

9. A composition according to claim 7, wherein R is selected from methyl or phenyl.

10. A composition according to claim 7, wherein $R^1$ is selected from ethylene, propylene, butylene, hexylene, or phenylene.

11. A composition according to claim 7, wherein A is selected from ethylene, propylene, butylene, hexylene, or ethyleneoxypropylene.

12. A composition according to claim 7, wherein (b) is selected from

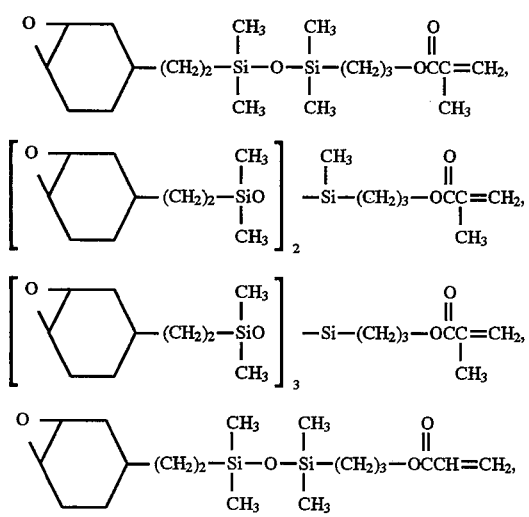

-continued

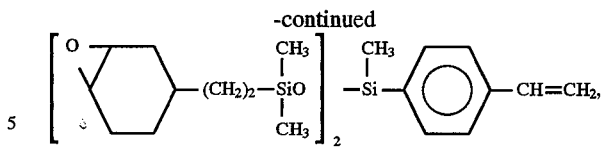

13. A composition according to claim 1, wherein (c) is selected from esters of acrylic acid, esters of methacrylic acid, styrene, derivatives of styrene, acrylic acid, methacrylic acid, vinyl acetate, vinylidene chloride, or polyalkylene glycol monomethacrylates.

14. A composition according to claim 13, wherein the ester of acrylic acid is selected from methyl acrylate, ethyl acrylate, or butyl acrylate.

15. A composition according to claim 1, wherein (B) is an onium salt.

16. A composition according to claim 15, wherein the onium salt is a diazonium salt having the formula $ArN_2^+Z^-$ wherein Ar is an aryl group and Z is selected from $BF_4$, $PF_6$, $AsF_6$, $SbF_6$, $SbCl_6$, $HSO_4$, or $ClO_4$.

17. A composition according to claim 15, wherein the onium salt is a sulfonium salt having the formula $R^3{}_3S^+Z^-$ wherein $R^3$ is selected from an alkyl group or aryl group and Z is selected from $BF_4$, $PF_6$, $AsF_6$, $SbF_6$, $SbCl_6$, $HSO_4$, or $ClO_4$.

18. A composition according to claim 15, wherein the onium salt is a iodonium salt having the formula $R^3{}_2I^+Z^-$ wherein $R^3$ is selected from an alkyl group or aryl group and Z is selected from $BF_4$, $PF_6$, $AsF_6$, $SbF_6$, $SbCl_6$, $HSO_4$, or $ClO_4$.

19. A composition according to claim 1, wherein (B) is selected from bis(dodecylphenyl)iodonium hexafluoroarsenate or bis(dodecylphenyl)iodonium hexafluoroantimonate.

20. A composition according to claim 2, wherein (d) is selected from azo compounds or peroxides.

21. A composition according to claim 20, wherein the azo compound is azobisisobutyronitrile, and the peroxide is selected from benzoyl peroxide or dicumyl peroxide.

22. A composition according to claim 1, wherein the composition further comprises a solvent.

23. A composition according to claim 22, wherein the solvent is selected from benzene, toluene, xylene, hexane, heptane, acetone, methyl ethyl ketone, methyl isobutyl ketone, ethyl acetate, butyl acetate, tetrahydrofuran, dioxane, diethyl ether, trichloroethane, or chloroform.

24. A cured coating prepared by:
(I) coating a radiation curable silicone release coating composition on the surface of a substrate wherein the coating composition comprises:
(A) 100 weight parts of an alicyclic epoxy-functional silicone graft copolymer prepared by a method comprising:
(I) reacting a mixture comprising:
(a) a silicone macromonomer which is free of epoxy groups and contains a vinyl-polymerizable group at one molecular chain terminal;
(b) a silicone compound having at least 1 alicyclic epoxy group and at least 1 vinyl-polymerizable group; and (c) an organic vinyl-polymerizable monomer with the proviso that the proportions for (a):(b):(c) are 1 to 80 weight percent:5 to 90 weight percent:0 to 94 weight percent, and also with the proviso that the sum of a+b+c is 100 weight percent; and (B) 0.1 to 20 weight parts of a photocuring catalyst; and (II) exposing the coating and the substrate to ultraviolet radiation in an amount sufficient to cure the coating.

* * * * *